(12) United States Patent
Xie et al.

(10) Patent No.: US 7,886,092 B2
(45) Date of Patent: Feb. 8, 2011

(54) KEYBOARD

(75) Inventors: Shu Xie, Shenzhen (CN); Yun-Shan Xiao, Shenzhen (CN)

(73) Assignees: Hong Fu Jin Precision Industry (ShenZhen) Co., Ltd., Shenzhen, Guangdong (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 177 days.

(21) Appl. No.: 12/197,320

(22) Filed: Aug. 25, 2008

(65) Prior Publication Data

US 2010/0023659 A1  Jan. 28, 2010

(30) Foreign Application Priority Data

Jul. 25, 2008  (CN) .................. 2008 1 0303106

(51) Int. Cl.
*G06F 13/12* (2006.01)
*G06F 3/00* (2006.01)

(52) U.S. Cl. .............................. 710/62; 710/36; 710/72

(58) Field of Classification Search .................. 710/36, 710/62, 72

See application file for complete search history.

(56) References Cited

U.S. PATENT DOCUMENTS

| 6,657,548 | B2 * | 12/2003 | Dai ...................... 340/815.45 |
| 2006/0007151 | A1 * | 1/2006 | Ram ............................ 345/163 |
| 2008/0316177 | A1 * | 12/2008 | Tseng .......................... 345/168 |
| 2010/0029383 | A1 * | 2/2010 | Dai .............................. 463/31 |

FOREIGN PATENT DOCUMENTS

CN  201035509 Y  3/2008

* cited by examiner

*Primary Examiner*—Alford W Kindred
*Assistant Examiner*—David E Martinez
(74) *Attorney, Agent, or Firm*—Zhigang Ma

(57) ABSTRACT

A keyboard includes a keyboard control circuit, a card reader unit, at least one universal serial bus (USB) interface, a switch, and a BLUETOOTH unit. The USB interface is capable of coupling to the card reader unit. The BLUETOOTH unit is selectively connected to the keyboard control circuit or the card reader unit via the switch.

8 Claims, 3 Drawing Sheets

KEYBOARD

BACKGROUND

1. Field of the Invention

The present invention relates to a keyboard.

2. Description of Related Art

A contemporary keyboard as an input device has very simple functions. The designers often focus their mind on improving keys of the keyboard rather than finding other uses for the keyboard.

What is needed, is a keyboard which has functions other than just data input.

DETAILED DESCRIPTION

Figure 1:
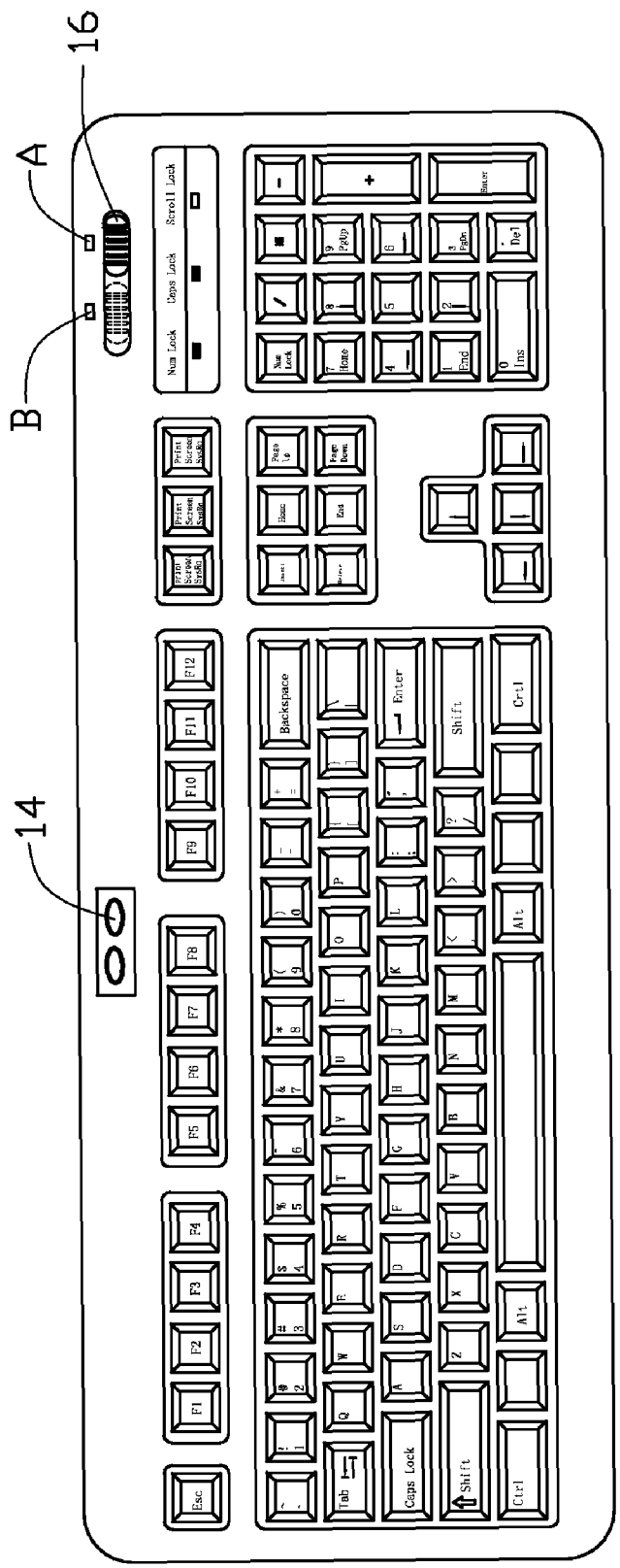
FIG. 1 is a top plan view of an embodiment of a keyboard in accordance with the present invention.
Figure 2:
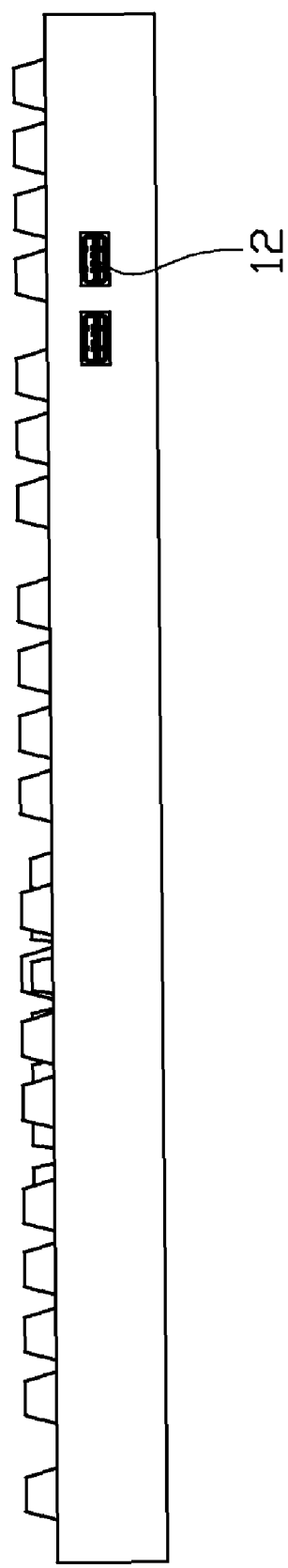
FIG. 2 is a rear elevational view of the keyboard in FIG. 1.
Figure 3:
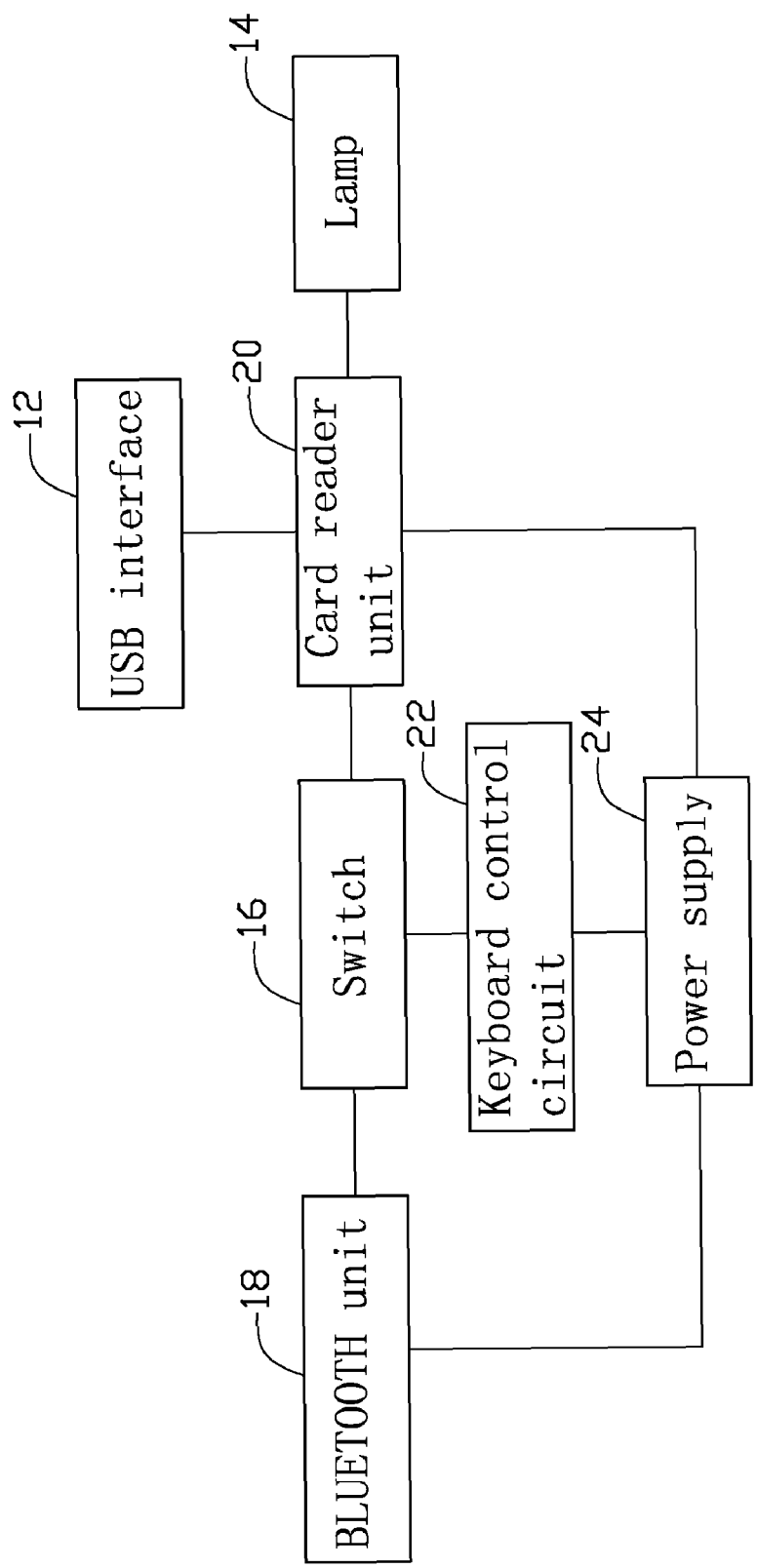
FIG. 3 is a functional block diagram of the keyboard in FIG. 1.

Referring to FIGS. 1 to 3, a keyboard in accordance with an embodiment of the present invention includes a plurality of keys (not labeled), two universal serial bus (USB) interfaces 12, a lamp 14 serving as an indication apparatus, a switch 16, a BLUETOOTH unit 18, a card reader unit 20, a keyboard control circuit 22, and a power supply 24.

The two USB interfaces 12 are arranged on a back of the keyboard. The two USB interfaces 12, which are connected to the card reader unit 20, are configured to be connected to a USB apparatus such as a flash memory (not shown). The lamp 14 is arranged on an upper surface of the keyboard. The lamp 14 is connected to the card reader unit 20 to indicate status of the flash memory, which is connected to the card reader unit 20 via one of the two USB interfaces 12. The switch 16 is arranged on the upper surface of the keyboard and includes three terminals. A first terminal of the switch 16 is connected to the BLUETOOTH unit 18. A second terminal of the switch 16 is connected to the card reader unit 20. A third terminal of the switch 16 is connected to the keyboard control circuit 22. The switch 16 is configured to connect the BLUETOOTH unit 18 to the card reader unit 20 or the keyboard control circuit 22 selectively. The BLUETOOTH unit 18 is configured to communicate with a host computer (not shown) with another BLUETOOTH unit. The power supply 24 supplies power to the BLUETOOTH unit 18, the card reader unit 20, and the keyboard control circuit 22. The BLUETOOTH unit 18, the card reader unit 20, and the keyboard control circuit 22 are arranged inside the keyboard.

When the switch 16 is slid to position A, the BLUETOOTH unit 18 is connected to the keyboard control circuit 22. The host computer can receive input signals of the keyboard via the BLUETOOTH connection between the BLUETOOTH unit 18 and its own BLUETOOTH unit. When the switch 16 is slid to position B, the BLUETOOTH unit 18 is connected to the card reader unit 20. The host computer can read information in the flash memory via the same BLUETOOTH connection, which is connected to one of the two USB interfaces 12. In addition, the lamp 14 is turned on.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternately embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A keyboard comprising:
   a keyboard control circuit;
   a card reader unit;
   at least one universal serial bus (USB) interface coupled to the card reader unit;
   a switch comprising a first terminal, a second terminal, and a third terminal; and
   a BLUETOOTH unit to selectively connect to the keyboard control circuit or the card reader unit via the switch, wherein the first terminal of the switch is connected to the BLUETOOTH unit, the second terminal of the switch is connected to the card reader unit, the third terminal of the switch is connected to the keyboard control circuit.

2. The keyboard as claimed in claim 1, wherein the at least one USB interface is arranged on a back of the keyboard.

3. The keyboard as claimed in claim 1, further comprising an indicate apparatus to indicate status of an USB apparatus which is connected to the card reader unit via one of the at least one USB interface, wherein the indicate apparatus is connected to the card reader unit, and arranged on an upper surface of the keyboard.

4. The keyboard as claimed in claim 3, wherein the indicate apparatus is a lamp.

5. A computer system comprising:
   a motherboard;
   a BLUETOOTH module connected to the motherboard; and
   a keyboard comprising:
      a keyboard control circuit;
      a card reader unit;
      at least one universal serial bus (USB) interface coupled to the card reader unit;
      a switch comprising a first terminal, a second terminal, and a third terminal; and
      a BLUETOOTH unit to selectively connect to the keyboard control circuit or the card reader unit via the switch, and communicating with the BLUETOOTH module for data exchange with the motherboard, wherein the first terminal of the switch is connected to the BLUETOOTH unit, the second terminal of the switch is connected to the card reader unit, the third terminal of the switch is connected to the keyboard control circuit.

6. The computer system as claimed in claim 5, wherein the at least one USB interface is arranged on a back of the keyboard.

7. The computer system as claimed in claim 5, further comprising an indicate apparatus to indicate status of an USB apparatus which is connected to the card reader unit via one of the at least one USB interface, wherein the indicate apparatus is connected to the card reader unit, and arranged on an upper surface of the keyboard.

8. The computer system as claimed in claim 7, wherein the indicate apparatus is a lamp.

* * * * *